(12) United States Patent
Pan et al.

(10) Patent No.: US 9,510,263 B2
(45) Date of Patent: Nov. 29, 2016

(54) METHOD OF ENHANCING HANDOVER BY USING A GROUP HANDOVER OVER A WIRELESS CONNECTION AND DEVICES THEREFOR

(71) Applicant: Industrial Technology Research Institute, Hsinchu (TW)

(72) Inventors: Meng-Shiuan Pan, New Taipei (TW); Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 586 days.

(21) Appl. No.: 14/017,320

(22) Filed: Sep. 4, 2013

(65) Prior Publication Data

US 2014/0073330 A1 Mar. 13, 2014

Related U.S. Application Data

(60) Provisional application No. 61/700,321, filed on Sep. 12, 2012.

(51) Int. Cl.
*H04W 36/00* (2009.01)
*H04W 36/32* (2009.01)
*H04W 36/30* (2009.01)
*H04W 36/04* (2009.01)
*H04W 36/08* (2009.01)
*H04W 84/00* (2009.01)

(52) U.S. Cl.
CPC ......... *H04W 36/32* (2013.01); *H04W 36/0055* (2013.01); *H04W 36/0083* (2013.01); *H04W 36/04* (2013.01); *H04W 36/08* (2013.01); *H04W 36/30* (2013.01); *H04W 84/005* (2013.01)

(58) Field of Classification Search
CPC ......... H04W 84/005; H04W 36/0016; H04W 36/0055; H04W 36/32
See application file for complete search history.

(56) References Cited

U.S. PATENT DOCUMENTS 7,697,930 B2 4/2010 Miao et al.
7,801,081 B2 9/2010 Choi et al.
(Continued)

FOREIGN PATENT DOCUMENTS

CN 1747450 3/2006
CN 102271373 12/2011
(Continued)

OTHER PUBLICATIONS

"Office Action of European Counterpart Application", issued on Mar. 3, 2014, p1-p5, in which the listed references were cited.
(Continued)

*Primary Examiner* — Khalid Shaheed
(74) *Attorney, Agent, or Firm* — Jianq Chyun IP Office

(57) ABSTRACT

A method of enhancing handover by using chain handover over a wireless connection, for use in a plurality of moving devices, is introduced. In the method, a control message is received by one of a plurality of moving devices. A report message is transmitted by the one of the plurality of moving devices, in which the one of the plurality of moving devices sets in a state for group handover and represents all others of the plurality of moving devices for a handover decision. It is determined that a part or all of the plurality of moving devices are allowed to perform the group handover according to the report message. The part or all of the plurality of moving devices allowed to perform the group handoversequentially perform a handover procedure after receiving a reconfiguration message.

43 Claims, 18 Drawing Sheets

(56) References Cited

U.S. PATENT DOCUMENTS

| | | | |
|---|---|---|---|
| 8,284,709 B2 | 10/2012 | Youn et al. | |
| 2004/0058678 A1 | 3/2004 | deTorbal | |
| 2006/0166699 A1* | 7/2006 | Aghvami | H04L 12/5695 455/552.1 |
| 2010/0061339 A1 | 3/2010 | Kim et al. | |
| 2010/0311419 A1 | 12/2010 | Bi | |
| 2011/0111753 A1 | 5/2011 | Vainikka et al. | |
| 2012/0231797 A1* | 9/2012 | Van Phan | H04B 7/15592 455/437 |
| 2012/0302240 A1* | 11/2012 | Tamaki | H04W 36/0016 455/436 |
| 2014/0073330 A1* | 3/2014 | Pan | H04W 36/0055 455/441 |

FOREIGN PATENT DOCUMENTS

| | | |
|---|---|---|
| CN | 102474792 | 5/2012 |
| EP | 1401229 | 3/2004 |
| TW | 201132157 | 9/2011 |
| WO | 2008084394 | 7/2008 |
| WO | 2011110229 | 9/2011 |

OTHER PUBLICATIONS

"3rd Generation Partnership Project; Technical Specification Group Radio Access Network; Mobile Relay for E-UTRA; (Release 11)", 3GPP Draft; TR36.836V110, 3rd Generation Partnership Project(3GPP), Mobile Competence Centre; 650, Route Des Lucioles; F-06921 Sophia-Antipolis Cedex; France, Aug. 17, 2012.

Tian et al., "Seamless Dual-Link Handover Scheme in Broadband Wireless Communication Systems for High-Speed Rail," IEEE Journal on selected areas in communications 30 (4), May 2012, pp. 708-718.

Zhang et al., "A Novel Self-optimizing Handover Mechanism for Multi-service Provisioning in LTE-Advanced," IEEE International Conference on Research Challenges in Computer Science, Dec. 28-29, 2009, pp. 221-224.

Huang et al., "Mobile relay based fast handover scheme in high-speed mobile environment," IEEE Vehicular Technology Conference (VTC Fall), Sep. 3-6, 2012, pp. 1-6.

Wang et al., "A Soft Handover Algorithm for TD-LTE System in High-Speed Railway Scenario," IEEE International Conference on Signal Processing, Communications and Computing (ICSPCC), Sep. 14-16, 2011, pp. 1-4.

Shan et al., "Predictive Group Handover Scheme with Channel Borrowing for Mobile Relay Systems," IEEE International Wireless Communications and Mobile Computing Conference (IWCMC), Aug. 6-8, 2008, pp. 153-158.

Balakrishnan et al., "Mobile Relay and Group Mobility for 4G WiMAX Networks," IEEE Wireless Communications and Networking Conference (WCNC), Mar. 28-31, 2011, pp. 1224-1229.

"Office Action of Taiwan Counterpart Application", issued on Mar. 20, 2015, p1-p15, in which the listed references were cited.

"Office Action of Chinese Counterpart Application", issued on Mar. 2, 2016, p1-p7, in which the listed references were cited.

* cited by examiner

METHOD OF ENHANCING HANDOVER BY USING A GROUP HANDOVER OVER A WIRELESS CONNECTION AND DEVICES THEREFOR

CROSS-REFERENCE TO RELATED APPLICATION

This application claims the priority benefits of U.S. provisional application Ser. No. 61/700,321, filed on Sep. 12, 2012. The entirety of the above-mentioned patent application is hereby incorporated by reference herein and made a part of this specification.

TECHNICAL FIELD

The technical field relates to a method of enhancing handover by using a group handover scheme over a wireless connection.

BACKGROUND

Recently, many countries build their high speed rail systems. In a high speed rail system, the typical speed of train is as high as 350 km/hr. The high speed trains are used to serve users for long distance travelling. For example, passengers may travel between countries in Europe, between provinces in China, and so on. It will be an attractive service to provide communication services, which allow users can browse the Internet, watching on-line videos, processing e-mails in the high speed rail.

In LTE-A standard working group, the mobile relay technique is discussed to support the high speed rail scenario. The scenario is shown in FIG. 1A. Mobile relays can be equipped in every carriage or in several carriages of a train. Users can connect to the mobile relay near to them. The mobile relay plays roles as an eNB for users. Mobile relay redirects the received data from users to the donor eNB (DeNB) deploying along the train route. On the other hand, the mobile relay also distributes the data from the network to users.

However, in the above scenario, the train go through base stations along the train route in a high speed, and all mobile relays will perform handover procedures one-by-one in short intervals. Therefore, it is important to design a very quick and still yet reliable handover scheme so as to allow users to communication services in a high speed rail.

SUMMARY

One of exemplary embodiments discloses a method of enhancing handover over a wireless connection, for use in a plurality of moving devices. In the method, a control message is received by one of a plurality of moving devices. A report message is transmitted by the one of the plurality of moving devices, in which the one of the plurality of moving devices sets in a state for group handover and represents all others of the plurality of moving devices for a handover decision. It is determined that a part or all of the plurality of moving devices are allowed to perform the group handover according to the report message. The part or all of the plurality of moving devices allowed to perform the group handoversequentially perform a handover procedure after receiving a reconfiguration message.

One of exemplary embodiments discloses a moving device includes a transmitter, a receiver, and a processing circuit coupled to the transmitter and the receiver. The transmitter transmits wireless signals, and the receiver receives wireless signals. The processing circuit is configured to receiving a control message and sets in a state for group handover to represent others of the plurality of moving devices in the group handover. The processing circuit is further configured to propreparing and transmitting a measure report to determine a number of the plurality of moving devices which are allowed to perform handover operation sequentially in the group handover.

One of exemplary embodiments discloses a control node including a transmitter, a receiver, and a processing circuit coupled to the transmitter and the receiver. The transmitter and the receiver respectively transmits and receives wireless signals, and the processing circuit is configured to transmitting a control message; receiving a report message in response to the control message by a moving device of a plurality of moving devices, wherein the one of the plurality of moving devices sets in a state for group handover to representing others of the plurality of moving devices in the group handover; and determining a group handover decision according to the report message from the one of the plurality of moving devices, if the result of the group handover decision indicates that the group handover is allowed, the control node preparing a plurality of timers sequentially for controlling the group handover and sending a handover request to a target control node.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
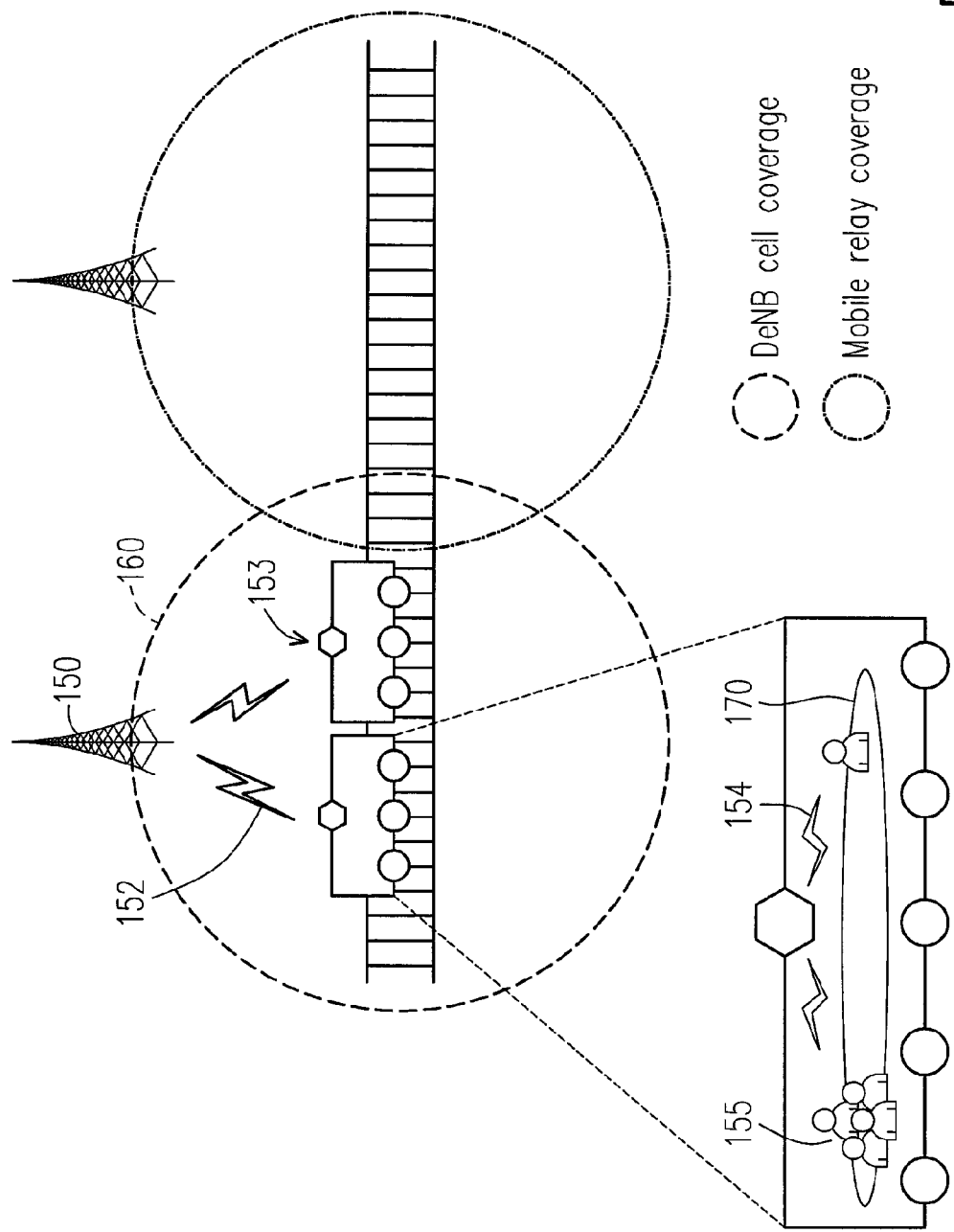
FIGS. 1A-1E provide an explanation for the concept upon which the disclosure is premised upon.

In one of exemplary embodiments, the disclosure introduces a handover procedure of a mobile relay based on alternative 1 in 3GPP TR 36.806, for example. The handover procedure for mobile relays may be divided into five parts: 1) Handover decision, 2) Path switch procedure, 3) Synchronization, 3) Path switch procedure, 4) OAM S1/X2 procedure, and 5) Data forwarding procedure. Since the mobile relays in the train are connected as a line, one mobile relay perform handover implies its next mobile relay will perform handover in a short period.

It is observed that some procedures may be redesigned to support to handover all mobile relays. For example, in one embodiment, in the measurement procedure, the information of the head mobile relay (the first mobile relay located in the first carriage) may be used to represent some or all mobile relays, but not limited thereto. In other embodiment, one of the other mobile relays may also be used for represent some or all mobile relays. In another embodiment, for example, in the handover decision procedure, the target DeNB may decide to let more than one mobile relays to handover when it receives a first handover request. In further embodiment, the path switch procedure is also able be to support switching paths for multiple mobile relays.

One of exemplary embodiments proposes a method for enhancing handover over a wireless connection for use in a plurality of moving devices, such as the mobile relays in carriages. In the method, a control message is received by one of a plurality of moving devices. A report message is transmitted by the one of the plurality of moving devices, in which the one of the plurality of moving devices sets in a state for group handover and represents all others of the plurality of moving devices for a handover decision. It is determined that a part or all of the plurality of moving devices are allowed to perform the group handover according to the report message. The part or all of the plurality of moving devices allowed to perform the group handover sequentially perform a handover procedure after receiving a reconfiguration message.

In one of implementing embodiments, the disclosure introduces concepts of the proposed group handover scheme in some vehicle with several carriages. Assume that each carriage has one mobile relay and there are n mobile relays in the train. According to the placement of these mobile relays, their sequence (from the head carriage to the last carriage) can be decided, denoted by a sequence S={u1, u2, . . . , un}, where uk is an user equipment identifier (UE ID) of the k-th mobile relay. The network may obtain the sequence S from the representing mobile relay, for example, the head mobile relay before the train is going to travel from the initial station. For the representing mobile relay, it reports S when it registers to the network. For other mobile relays, they can perform registration procedure as usual. After all mobile relays finish their registration procedure, the network can identify or recognize each of the mobile relay in the train. Then the network takes those mobile relays in a train as a group. For a group, the network can assign a group ID to the corresponding train. When handover, the network can utilize the group ID to differentiate trains. The group ID can transmit to the representing mobile relay when sending registration response to the head mobile relay.

In one of exemplary embodiments, the mobile relays have two states: a group handover state or a conventional handover state, for example, the mobile relays operate in a chain handover state (Chain-HO) or in a conventional handover state (CVN-HO). If a representing mobile relay, for example, the head mobile relay (of the train) is in Chain-HO state, it does measurements. The head mobile relay may represent for those mobile relays that are also in Chain-HO state. When a group handover procedure is performed, the core network can issue handover commands to upcoming mobile relays directly without receiving any measurement reports from them. The network can also switch routing paths in advance for upcoming handover procedures.

The group handover procedure starts by the serving DeNB sending a measurement control to all mobile relays in the train. For example, for a chain handover procedure, those mobile relays switch their state to the Chain-HO state. The representing mobile relay, for example, the head mobile relay sends a chain measurement report according to the measurement command carried in chain measurement control. Note that the head mobile relay performs measurement procedure to sense the signal of neighbor DeNBs. For other mobile relays, they can also perform measurement procedure as the conventional way. If the head mobile relay realizes that the signal quality of a neighbor DeNBis above the threshold, it prepares a chain measurement report and then sends to the source DeNB. The sent chain measurement report represents those mobile relays that are in Chain-HO state. After receiving the chain measurement report, the source DeNB can make a handover decision. In the one hand, if the information in the measurement report does not satisfy the handover criteria, the source DeNB decides not to handover. On the other hand, if deciding to handover, the source DeNB sends a handover request to target DeNB to require resources for mobile relays. The handover request contains needed information (of all mobile relays in the train) for performing a group handover.

Before sending the handover request, the source DeNB will prepare a Tc timer list, which contains a list of time intervals defined as Tc={Tc1, Tc2, . . . , Tcn−1}. All Tc values can be the same or can be different. These time intervals are used to predict when the next carriage may need to handover or switch path in the core network. In other words, the timer is to automatically control the restart timing of the handover and patch switch procedures.

The target DeNB that receives the handover request makes a decision according to its admission control policy. There are three possible results. First, the target DeNB rejects all mobile relay by replying a handover request response, such as a chain handover request NACK, carrying that it can accept zero mobile relays. Second, the target DeNB can partially accept k mobile relays by replying a handover request response, such as another handover request NACK carrying that it can accept k mobile relays or the UE ID of the mobile relays it accepts. Third, the target DeNB can accept all mobile relays by replying a handover request response, such as other chain handover request ACK.

In the one of exemplary embodiments, the handover and path switch procedure of the head mobile relay is unchanged, i.e., following the specifications of the system. If the head mobile relay was accepted, the source DeNB performs handover procedure for it by sending RRC connection reconfiguration. This sent configuration is assembled as the conventional scheme. After receiving RRC connection reconfiguration, the head mobile relay can start to perform handover procedure by original handover procedure. The head mobile relay first performs synchronization procedure. Then it can perform non-access-stratum tracking area update procedure. After that, the target DeNB sends a path switch request to the MME (Mobility Management Entity, MME) and then the MME sends a user plan update and create bearer request to the serving gateway. The serving GW replies the corresponding response or acknowledgement. After the above procedure, the head mobile relay obtains a new route path to the target DeNB. The mobile relay and the source/target DeNBs follow the S1/X2 and data forwarding procedures to finish the handover procedures of the head mobile relay.

The handover and path switch procedures of those non-head mobile relays (the sequence that recorded in S) starts by the chain handover control module and chain path switch control module. The restart timing is decided by the Tc timer list. A procedure of Car 2 sequentially followed Car 1 (head mobile relay) is described for an example. The source DeNB restarts the handover procedures for the second mobile relay in Car 2 by sending RRC connection reconfiguration. The target DeNB restarts the path switch procedures for second mobile relay by sending a path switch request. Unlike procedures of head mobile relay, the path switch request acknowledgement only reply to target DeNB after receiving the tracking area update from the second mobile relay. This is to guarantee the path switch procedure has been finished successfully. After the above operations, the second mobile relay performs S1/X2 and data forwarding procedures to finish its handover. Then the other mobile relays can follow similar procedures.

Several exemplary embodiments accompanied with figures are described in detail below to further describe the disclosure in details, but not limited thereto.

FIG. 1A-1E provides an explanation for the concept upon which the disclosure is premised upon. FIG. 1A serves as an example to illustrate the concept of providing the network coverage through a mobile delay. FIG. 1A shows a donor eNodeB (DeNB) 150 providing the network coverage within its coverage area 160 to at least one mobile relays 153 located in a train carriage. After a backhaul link 152 is established between the DeNB 150 and the mobile relay 153, the mobile relay may be able to provide the network coverage to at least one user equipment (UE) 155 through an access link 154 between each UE and the mobile relay 153. The mobile relay 153 then serves as a base station to at least one UE under its coverage 170.

Figure 1B:
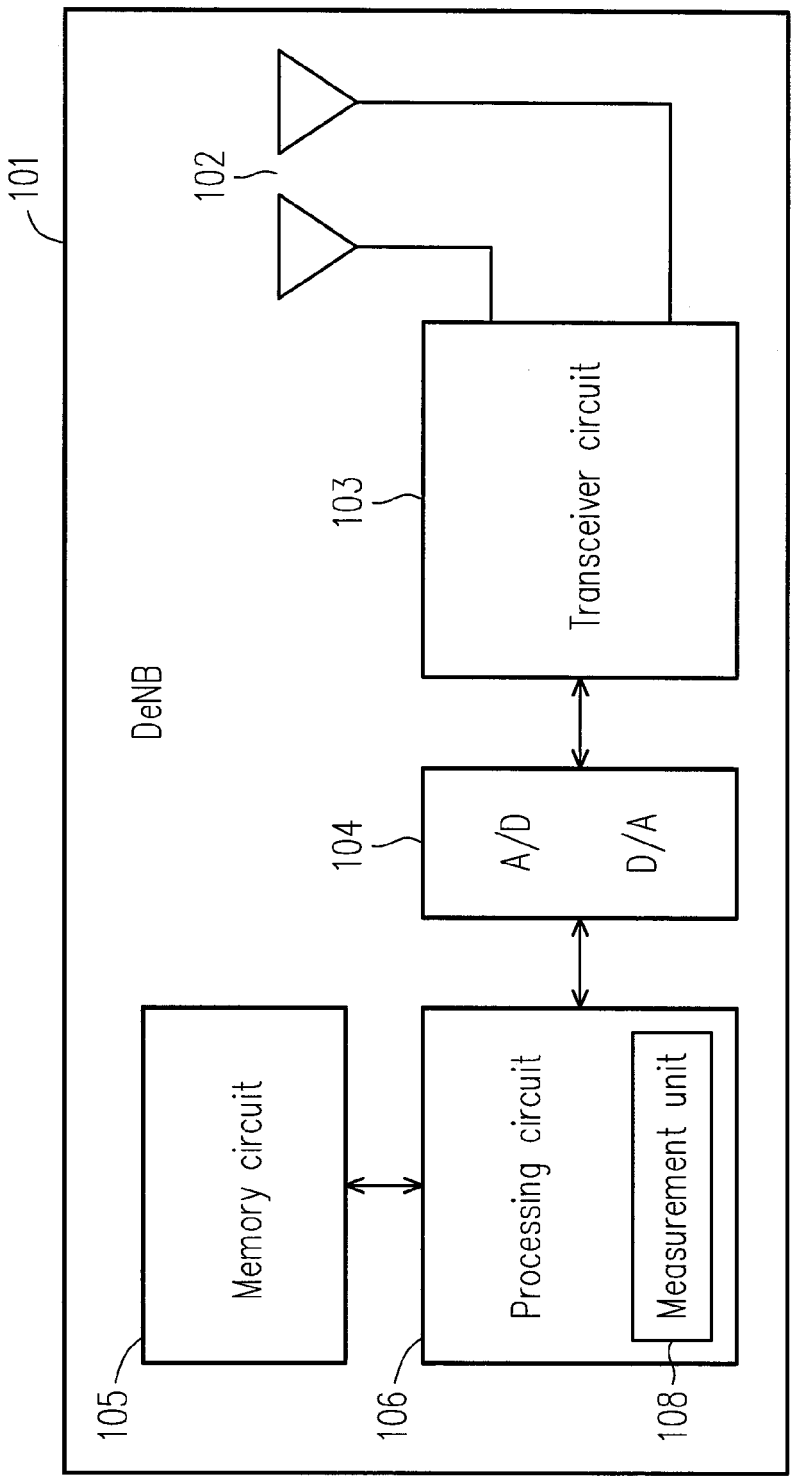

FIG. 1B shows an example of a functional block diagram of a DeNB used in the relay system of the present disclosure. Each DeNB 101 of the relay system may contain at least but not limited to a transceiver circuit 103, an analog-to-digital (A/D)/digital-to-analog (D/A) converter 104, a processing circuit 106, a memory circuit 107, and at least one antenna unit 102. The transceiver circuit 103 includes at least one power amplifier and may transmits downlink signals and receives uplink signals wirelessly through the at least one antenna unit 102. The transceiver circuit 103 may also perform operations such as low noise amplifying, impedance matching, frequency mixing, up or down frequency conversion, filtering, amplifying, and so like. The analog-to-digital (A/D)/digital-to-analog (D/A) converter (104) is configured to convert from an analog signal format to a digital signal format during uplink signal processing and digital signal format to analog signal format during downlink signal processing.

The processing circuit 106 is configured to process digital signals and includes a measurement unit 108 to perform tasks such as performing handover analysis, processing measurement reports received from a mobile relay, triggering a handover, and so forth. Also, the processing circuit 106 may include a memory circuit 105 to store programming codes, codebook configurations, buffered data, or network configurations assigned by the processing circuit 106. The functions of the processing circuit 106 may be implemented using programmable units such as a micro-processor, a micro-controller, a DSP chips, FPGA, and etc. The functions of the processing circuit 106 may also be implemented with separate electronic devices or ICS. It should be noted that the handover circuit 108 may be implemented with either hardware or software.

Figure 1C:
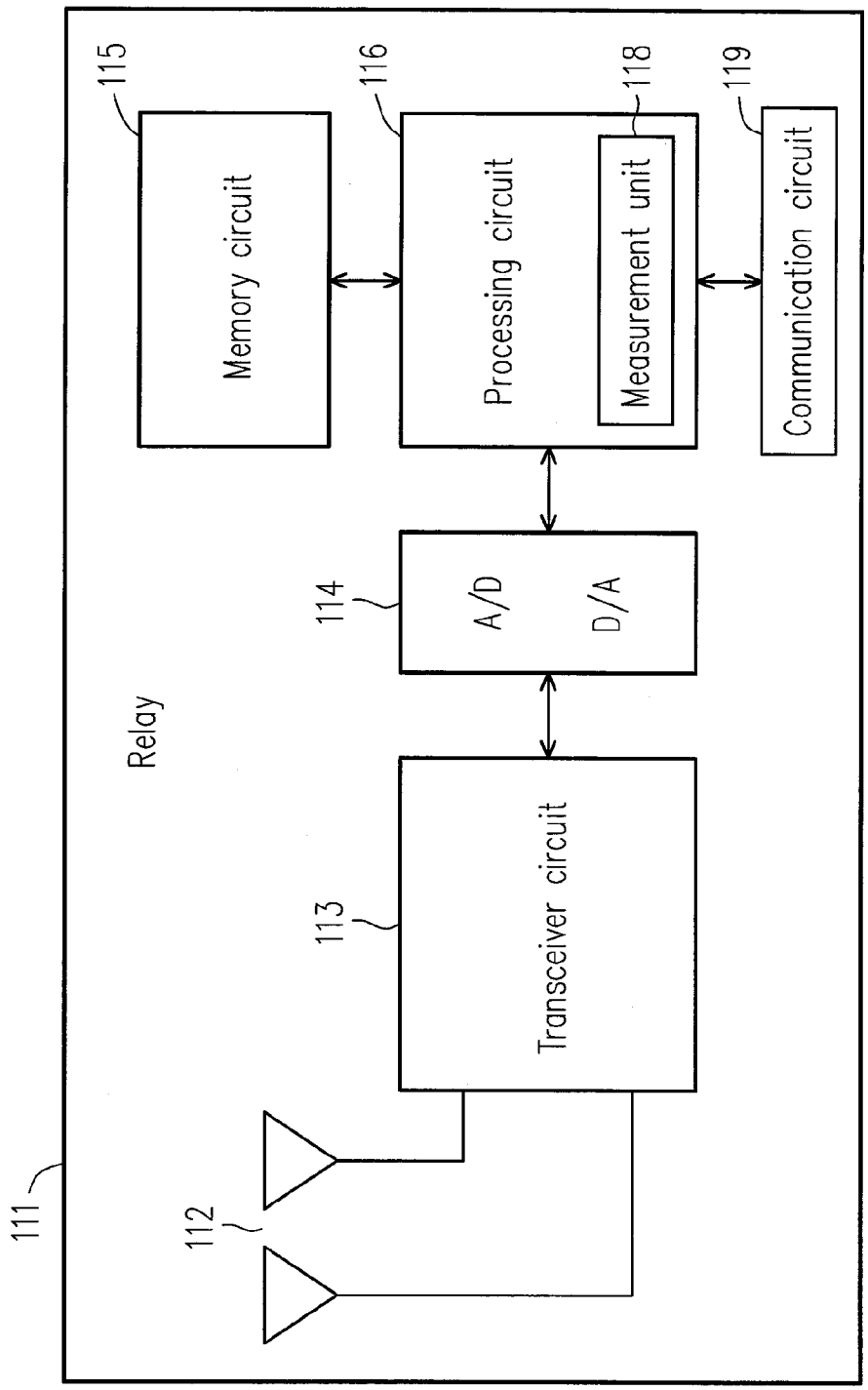

FIG. 1C is an example of a functional block diagram of a mobile relay used in the relay system of the present disclosure. Each mobile relay 111 of the communication system may contain at least but not limited to a transceiver circuit 113, an analog-to-digital (A/D)/digital-to-analog (D/A) converter 114, a processing circuit 116, a memory circuit 117, and one or more antenna units 112. The memory circuit 117 may include a memory unit 115 which may store programming code, buffer data, and network configurations. The processing circuit 116 may further include a measurement unit 118.

Functionally, the mobile relay 111 could be described as relaying signals from a DeNB. The transceiver circuit 113 may include a front end low noise amplifier which maintains a low signal to noise ratio for the system, and then the RF signal may be converted to IF or baseband for further amplification and waveform shaping before converting into digital signals. The mobile relay 111 may further include a communication circuit 119 which provides wired access or fiber optical links to users.

Figure 1D:
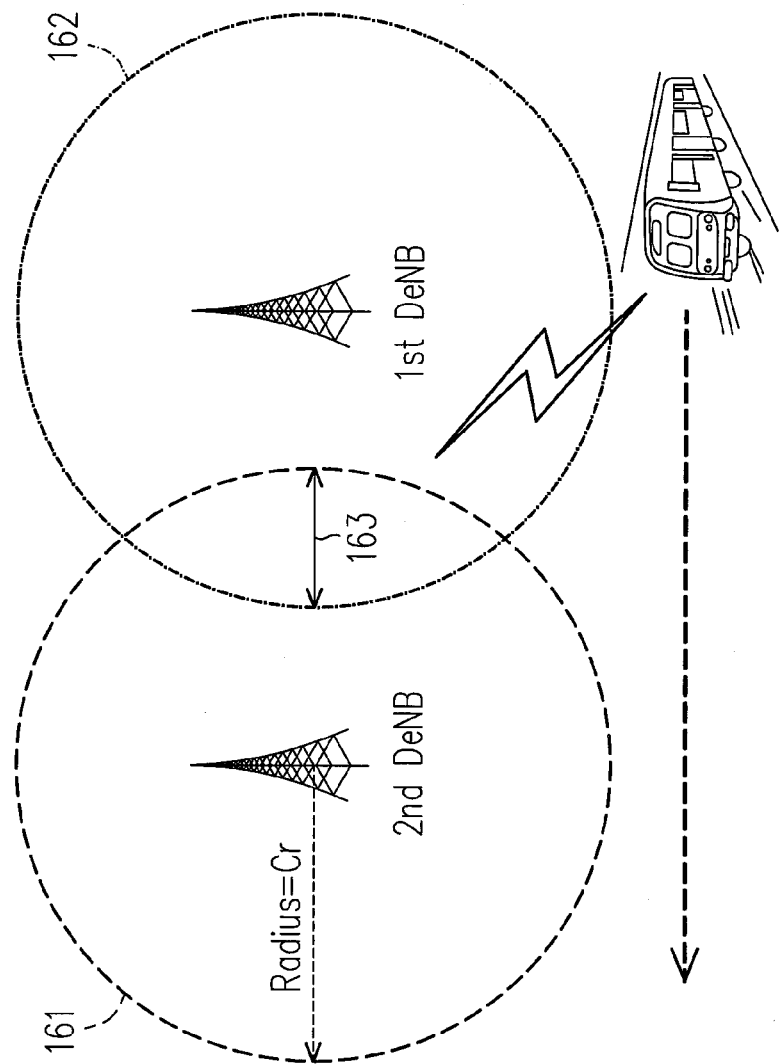

FIG. 1D illustrates the service handover from one DeNB to another as a train travels between two coverage areas. As the train travels within a coverage area 162 for a first DeNB ("Source DeNB" 164), the mobile relay could be configured to detect for the presence of nearby DeNBs. As the train moves within the coverage area 161 of a second DeNB ("Target DeNB" 165), a mobile relay could be configured to start a measurement report and to prepare for an eventual handover procedure. The handover procedure to switch the network service on the mobile relay may be required to be completed before the train leaves the coverage area 162 of the source DeNB 164 in order for the mobile relay to enjoy uninterrupted network service. Therefore, for uninterrupted network service, the measurement report and handover decisions would be performed within the overlapping distance 163 between the first coverage area 162 and the second coverage area 161.

Figure 1E:
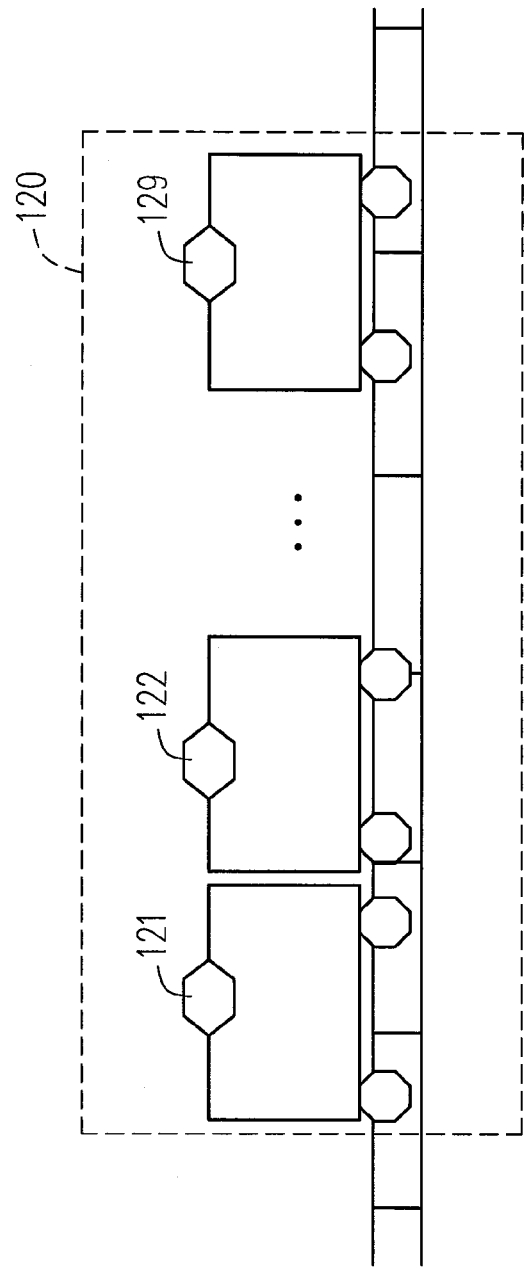

FIG. 1E serves as an example to illustrate each mobile relay is located on a train carriage. Various mobile relays 121, 122, . . . , and 129 which are involved in the exemplary embodiment of the disclosure, and they are collectively referred to as a mobile relay group 120. In the embodiment, each carriage has one mobile relay and there are n mobile relays in the train. According to the arrangement of these mobile relays, the sequence (from the first mobile relay 121 to the last mobile relay 129) could be decided, denoted by a sequence S={$u_1$, $u_2$, . . . , $u_n$}, where $u_k$ is an user equipment identifier (UE ID) of the mobile relay in k-th carriage. The network could obtain the sequence S from the first mobile relay 121 before the train is going to travel from the initial station, for example, the network can know the number of carriages (mobile relays) in the train and the sequence of the placements of the mobile relays in the train. For the first mobile relay 121, as shown in FIG. 1D, it reports the sequence S when it is going to register to the network through the target DeNB 165. For other mobile relays, they could perform registration procedure as usual. After all mobile relays finish their registration procedure, the network could identify or recognize each of the mobile relay in the train through the target DeNB 165. Then the network takes those mobile relays in the train as a group as the mobile relay group 120. For a group, the network could assign a group ID to the corresponding train. When the handover is preceded, the network could utilize the group ID to differentiate trains. The group ID could transmit to the first mobile relay 121 when sending registration response to the first mobile relay 121.

According to an exemplary embodiment of the disclosure, the mobile relays may operate during handover, for example, in two states, one is in a chain handover (Chain-HO) state and the other is in a conventional handover (CVN-HO) state. If the first mobile relay 121 (of the train) is in Chain-HO state, it could be configured to start a measurement report. The first mobile relay 121 could represent for those mobile relays that are also in the Chain-HO state. The state transition between Chain-HO and CVN-HO states will be described below.

Figure 2A:
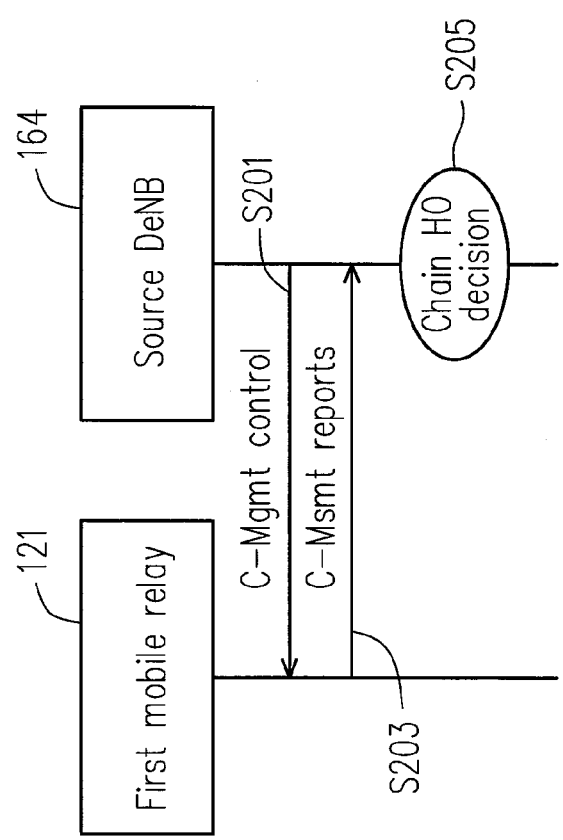
FIG. 2A is a flowchart showing a handover decision of a group handover procedure between a first mobile relay and a source DeNB according to one of exemplary embodiments.

FIG. 2A is a flowchart showing a chain handover decision of a chain handover procedure between a first mobile relay and a source DeNB according to one of exemplary embodiments. As the train moves within the coverage area 162 of the source DeNB 164 (as shown in FIG. 1D), the source DeNB 164 transmits a chain management control message ("C-Mgmt control") to all mobile relays in step S201. The first mobile relay 121 that receives the chain measurement control message from the source DeNB 164 operates in the Chain-HO state and replies the information in a chain measurement control message ("C-Msmt reports") to the source DeNB 164. In one embodiment, when some or all of the mobile relays in the train operate in Chain-HO state for handover, the first mobile relay 121 will represent the mobile relay group 120. However, the mobile relays can leave the Chain-HO state if the mobile relays handover to the other DeNB, if the mobile relays receive a message of a chain handover stop in the chain measurement control message, or if the mobile relays receive a conventional measurement control message.

The first mobile relay 121 sends the chain measurement report to the source DeNB 164 according to a measurement command carried in the chain measurement control message. In addition, the first mobile relay 121 performs a measurement procedure to sense a signal from neighbour DeNB, for example, the target DeNB 165, as shown in FIG. 1D. For other mobile relays, they can also perform the measurement procedure as the conventional way. If the first mobile relay 121 realizes that the signal quality of the neighbour DeNB is above or over a threshold, which may be predetermined in advance. The first mobile relay 121 prepares the chain measurement report message and then sends it to the source DeNB 164, as in step S203. The chain measurement report message may contain the information which includes, for example, the conventional measurement result or event result, the sequence of UE ID of the mobile relays to handover (sequence S), the information that represents for the mobile relay group 120, and/or the speed of the train. Further, the chain measurement report message represents those mobile relays that are in the Chain-HO state. When the source DeNB 164 receives the chain measurement report message, the source DeNB 164 which decides whether the first mobile relay 121 can handover by performing an operation of chain handover decision function ("chain HO decision") in step S205. This will be further explained below.

After the source DeNB 164 receives the chain measurement report message from the first mobile relay 121, the source DeNB 164 may decide whether the chain handover may be performed based on the chain measurement report message and the network state. If the information in the measurement report message does not satisfy criteria for chain handover, the source DeNB 164 may decide not to perform the chain handover and wait other chain measurement reports message. Otherwise if the first mobile relay 121 may perform the chain handover, the source DeNB 164 will prepare a timer Tc list for a chain handover timer control and a chain path switch timer control functions, in which the timer Tc may be unique for these two control timers. In one embodiment, the list of Tc is computed by the source DeNB 164 according to, for example, the velocity of the train, the length of each carriage, and/or the overlapping area of source and target DeNB, or other factors which may affect the handover processing. Further, the length of the timer Tc may be as the number of mobile relays in the train. For instance, if there are m mobile relays in the train, the source DeNB 164 decides $Tc_1$, $Tc_2$, . . . , and $Tc_m$. Then, the source DeNB 164 will complete the operation of the chain handover decision function and send a chain handover request message ("c-handover request") to the target DeNB 165. This will be further explained below by referred to FIG. 2B and FIG. 2C.

Figure 2B:
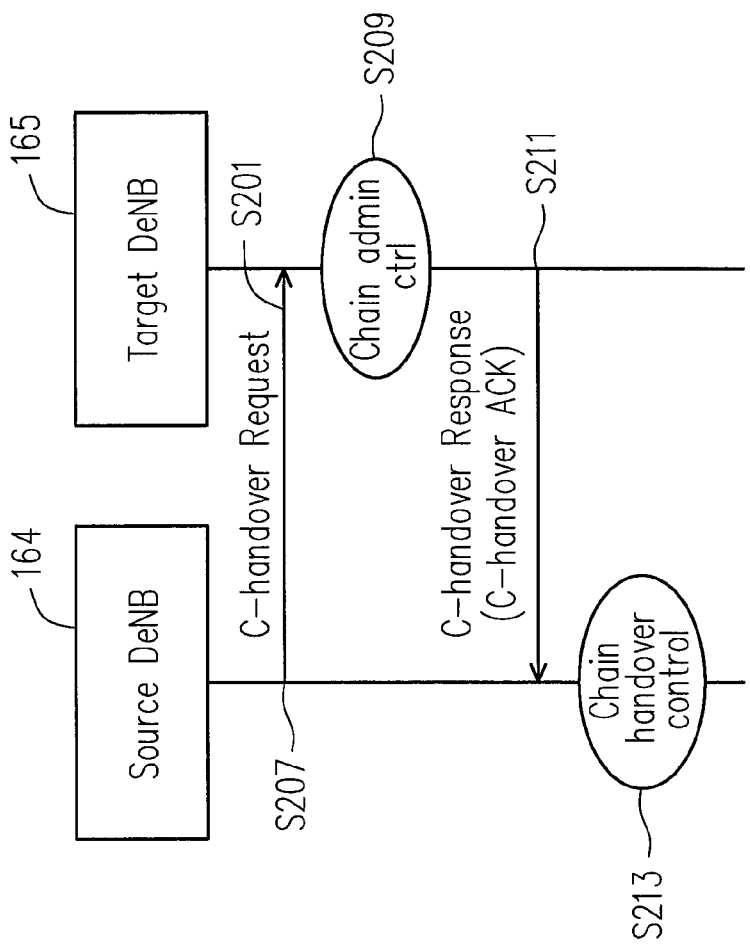
FIG. 2B is a flowchart showing a handover decision part of a group handover procedure between the target DeNB and the source DeNB according to an exemplary embodiment.
Figure 2C:
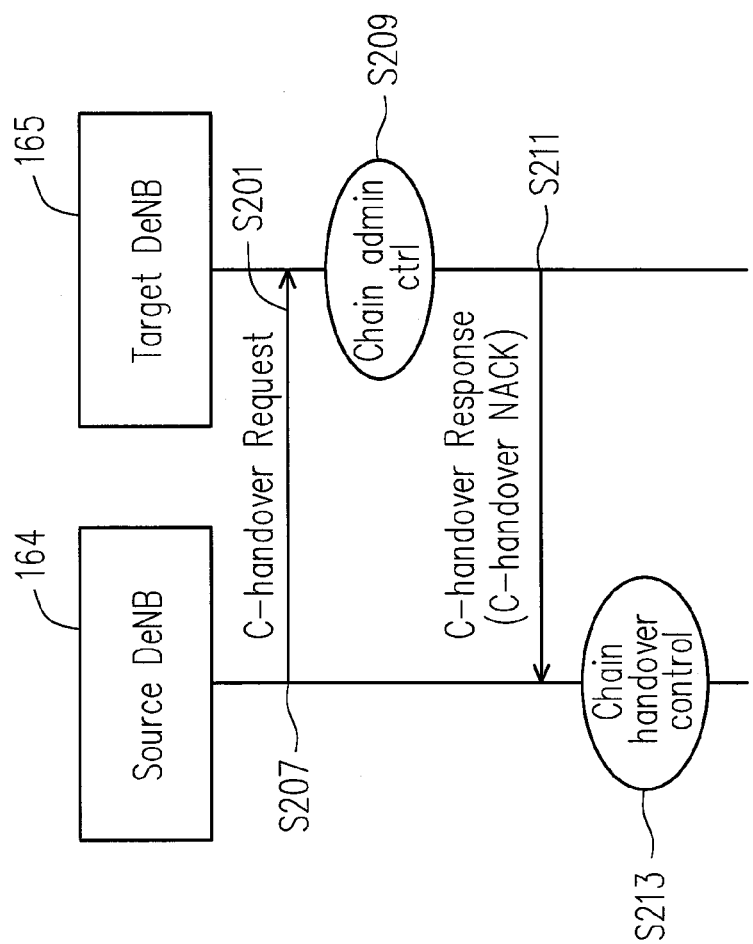
FIG. 2C is a flowchart showing a handover decision part of a group handover procedure between the target DeNB and the source DeNB according to another exemplary embodiment.

FIG. 2B is a flowchart showing a handover decision part of a chain handover procedure between the target DeNB and the source DeNB according to an exemplary embodiment, and FIG. 2C is a flowchart showing a handover decision part of a chain handover procedure between the target DeNB and the source DeNB according to another exemplary embodiment. By referring to FIG. 2B, the target DeNB 165 receives the chain handover request message ("C-handover request") from the source DeNB 164 in step S207. The chain handover request message includes not only all information in the conventional handover request message but also the sequence S, the needed information to pretend other mobile relays for performing (included ECGI of the of the target DeNB 110, UE-AMBR, UE Security Capability, eNB key, and E-RAB to be setup (E-RAB ID, QCI, ARP, S1 S-GW TEID)), and the timer Tc list.

After sending the chain handover request message, the timer $Tc_1$ will be started for an operation of chain handover control function ("Chain handover control"). When the target DeNB 165 receives the chain handover request message, it will perform an operation of a chain admission control function ("Chain Admin ctrl") which decides whether to let all or some of the mobile relays of the corresponding train to attach according to its admission control policy. The target DeNB 165 will send a handover response, such as a chain handover response ("C-handover Response"), for replying the decision result to the source DeNB 164. In step S211, if the target DeNB 165 accepts all mobile relays to attach, the chain handover response will be a chain handover request ACK message ("C-handover ACK"), which includes the needed information for the source DeNB 164 to perform chain handover procedures, in which the needed information may at least include Target C-RNTI, Target DRB ID (UL/DL), Target eNB AS Security Algorithm, and/or confirmation of the Tc timer list.

The source DeNB 164 that receives the chain handover request ACK message will perform the chain handover procedures for all mobile relays belonging to the same group by the operation of a chain handover control function in step S213 with further handover decision procedures being performed for the handover procedures by the mobile relays except for the first mobile relay 121.

By referring to FIG. 2C, if the target DeNB 165 cannot accept all mobile relays to attach, the chain handover response will be a chain handover request NACK message ("C-handover NACK") in step S211, in which the chain handover response may include a unsuccessful flag, the amount of j mobile relays it can accept (wherein j≥0), and a confirmation of Tc timer list. The source DeNB 164 that receives the chain handover request NACK message will perform handover procedures for first j mobile relays by the operation of chain handover control function in step S213. In one embodiment, for the rest of the mobile relays which is/are not allowed to perform the chain handover procedure will receive a conventional measurement control from the source DeNB 164 for performing the conventional measurement and handover as usual.

In addition, if the target DeNB 165 sends the chain handover request ACK message or the chain handover request NACK message included the information of the amount of j which not equal to zero the target DeNB 165 can accept, the target DeNB 165 records the Tc timer list for an operation of a chain path switch control function and starts the timer Tc for the operation of the chain handover control function for the second mobile relay 122 (as shown in FIG. 1E) if the second mobile relay 122 is accepted to perform the chain handover procedure.

Figure 2D:
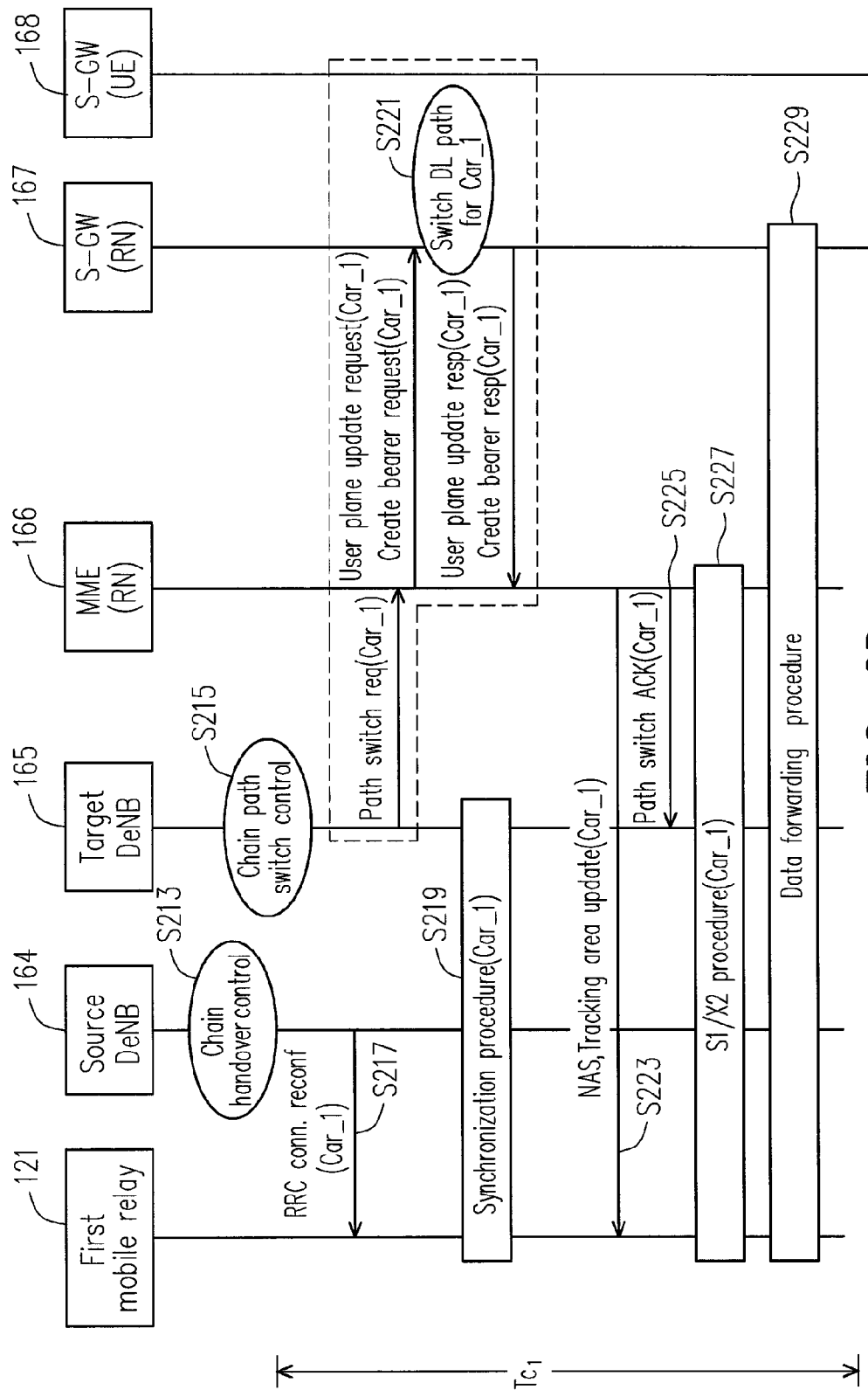
FIG. 2D schematically illustrating a source DeNB first starts the timer $Tc_1$ and then judges if the first mobile relay is accepted by the network according to one of exemplary embodiments.

In step S213, the operation of chain handover control function is triggered when the source DeNB 164 receives a handover request ACK/NACK message. FIG. 2D schematically illustrating a source DeNB first starts the timer $Tc_1$ and then judges if the first mobile relay is accepted by the network according to one of exemplary embodiments. As in FIG. 2D, the source DeNB 164 first starts the timer $Tc_1$ and then judges if the first mobile relay 121 is accepted by the network. If the first mobile relay 121 is accepted by the target DeNB 165 for the chain handover procedure, the source DeNB 165 triggers a RRC connection reconfiguration message ("RRC conn. reconf") in step S217 which is assembled as a scheme for the first mobile relay 165 to start handover and path switch procedures. The needed information of the RRC connection reconfiguration message can be obtained by chain measurement report. A chain path switch control function is performed by a chain path switch control module in the target DeNB 165 in step S215.

After the first mobile relay 121 receives the RRC connection reconfiguration message, the first mobile relay 121 can start to perform the handover procedure by the original handover procedure. The first mobile relay 121 first performs synchronization procedure, in step S219. The synchronization procedure may be the original synchronization procedure as defined in the LTE standard, for example.

After the chain path switch control function by the target DeNB 165 is triggered, as in step S215, a non-access-stratum (NAS) tracking area update procedure may be performed. After the above procedure, the target DeNB 165 sends a path switch request ("Path switch req") to the mobility management entity (MME) 166 and then the MME 166 sends a user plan update and create bearer request to the serving gateway (S-GW) 167. The MME 166, as defined in LTE standard, is a control-node for the LTE access-network, which is responsible for idle mode user equipment (UE) tracking and paging procedure including retransmissions. The serving gateway (S-GW) 167 routes and forwards user data packets.

The serving GW 167 replies the corresponding response or acknowledgement, and a switch download path ("Switch DL path") is established in step S221. The MME 166 sends NAS tracking area update information to the first mobile relay 121 in step S223 and also sends a path switch acknowledge message ("Path switch ACK") to the target DeNB 165. After the above procedure, the first mobile relay 121 obtains a new route path to the target DeNB 165. Then the first mobile relay 121 and the source/target DeNBs 164/165 follow the S1/X2 in step S227 and data forwarding procedures to finish the handover procedures of the first mobile relay 121 in step S229.

Figure 2E:
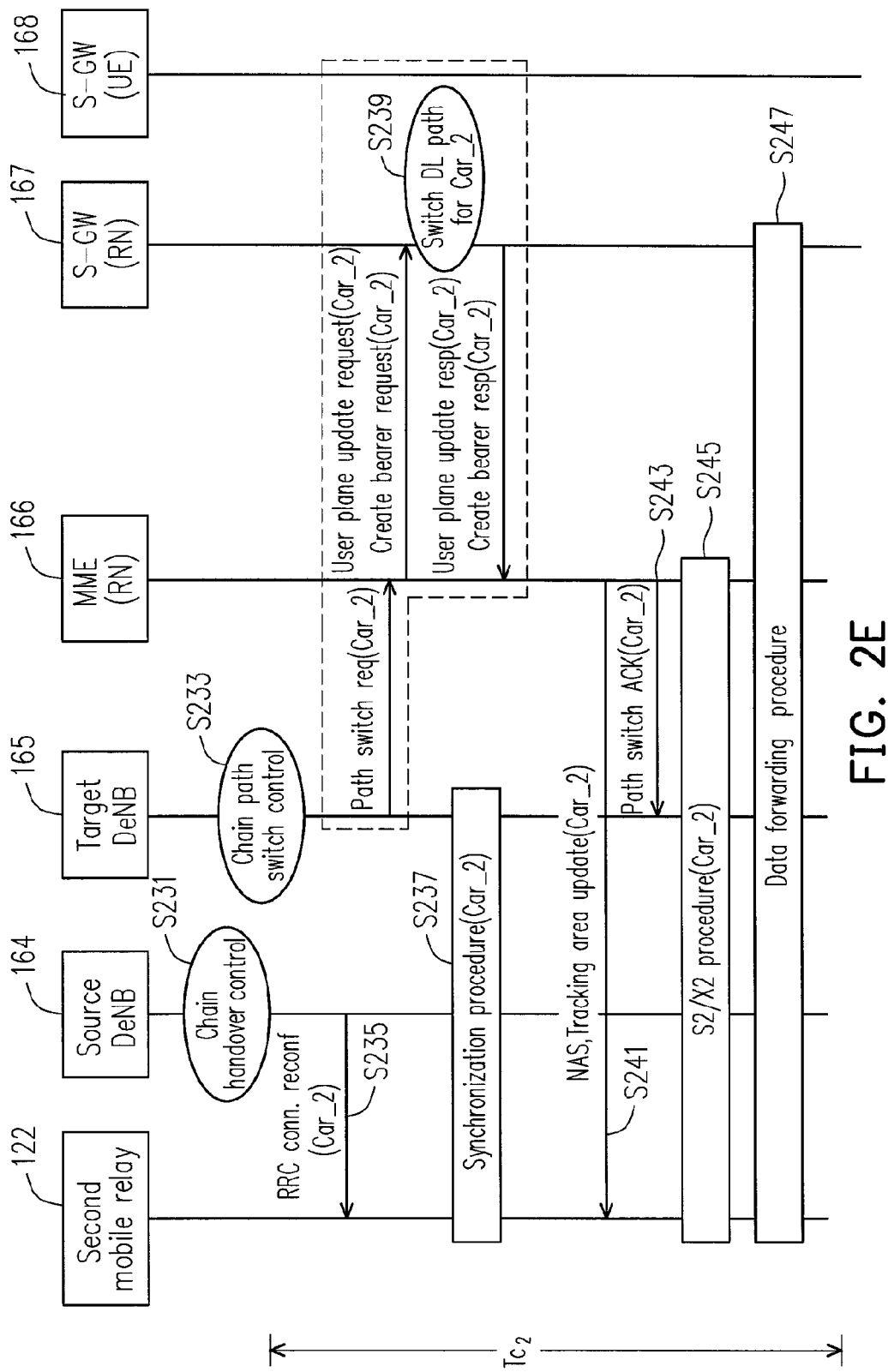
FIG. 2E is a flowchart showing synchronization and path switch part of a group handover procedure according to an exemplary embodiment.

FIG. 2E is a flowchart showing synchronization and path switch part of a chain handover procedure according to an exemplary embodiment. When the source DeNB 164 receives a chain handover request ACK message or a chain handover request NACK message included the information of the amount of j which not equal to zero the target DeNB 165 can accept, the source DeNB 164 will starts the timer $Tc_1$ in the operation of chain handover control function. After the timer $Tc_1$ expires, it will trigger the operation of the chain handover control function again in step S231 for the sequential mobile relay in the next carriage of the train. Then the source DeNB 164 starts a timer $Tc_2$ for the next handover procedure of the second mobile relay 122 if the second mobile relay 122 is allowed to perform the chain handover procedure. Otherwise, the source DeNB 164 will stop the chain handover procedure but restart a conventional handover procedure.

If the second mobile relay 122 is accepted by the target DeNB 165 for the chain handover procedure, the source DeNB 165 will send a RRC connection reconfiguration message to the second mobile relay 122 in step S235. The source DeNB 164 first starts the timer $Tc_2$ and then triggers a RRC connection reconfiguration message ("RRC conn. reconf") in step S235 which is assembled as a scheme for the first mobile relay 165 to start handover and path switch procedures. The needed information of the RRC connection reconfiguration message can be obtained by chain measurement report. A chain path switch control function is performed by a chain path switch control module in the target DeNB 165 in step S233.

After the second mobile relay 122 receives the RRC connection reconfiguration message, the second mobile relay 122 can start to perform the handover procedure by the original handover procedure. The second mobile relay 122 first performs synchronization procedure, in step S237. The synchronization procedure may be the original synchronization procedure as defined in the LTE standard, for example.

After the chain path switch control function by the target DeNB 165 is triggered, as in step S233, a non-access-stratum (NAS) tracking area update procedure may be performed. After the above procedure, the target DeNB 165 sends a path switch request ("Path switch req") to the mobility management entity (MME) 166 and then the MME 166 sends a user plan update and create bearer request to the serving gateway (S-GW) 167. The serving gateway (S-GW) 167 replies the corresponding response or acknowledgement, and a switch download path ("Switch DL path") is established in step S239. The MME 166 sends NAS tracking area update information to the second mobile relay 122 in step S223 and also sends a path switch acknowledge message ("Path switch ACK") to the target DeNB 165. After the above procedure, the second mobile relay 122 obtains a new route path to the target DeNB 165. Then the second mobile relay 122 and the source/target DeNBs 164/165 follow the S1/X2 in step S245 and data forwarding procedures to finish the handover procedures of the second mobile relay 122 in step S247.

According to the above description of the chain handover for the second mobile relay 122, the other mobile relays which are accepted by the target DeNB 165 for performing the chain handover procedure will follow the similar procedure. For example, after the timer $Tc_i$ expires, the source DeNB 164 will trigger the operation of chain handover control function again, and then the source DeNB 164 starts a timer $Tc_{i+1}$ for the next handover procedure if the i+1th mobile relay is allowed to perform a chain handover procedure. And, after the timer Tc expires, the path switch control function configures the path switch procedure for the ith mobile relay. After the synchronization, path switch, S1/X2 and data forwarding procedures as the above described, the ith mobile relay will finish its handover procedure.

Figure 3A:
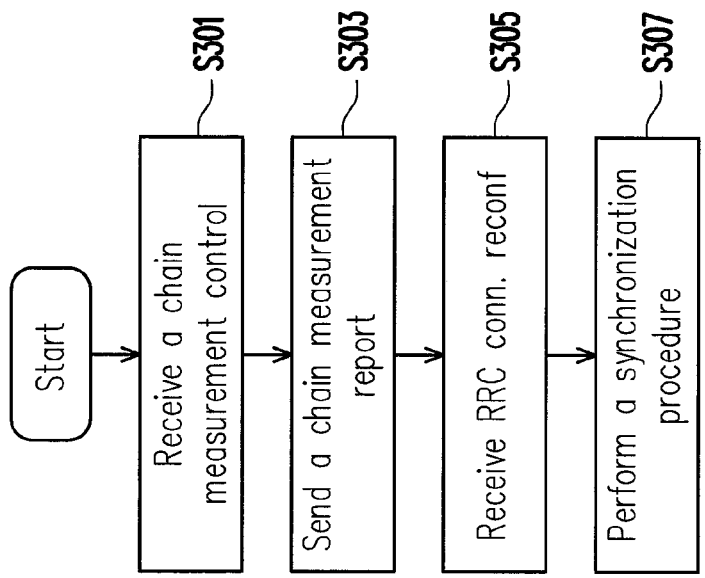
FIG. 3A is a flowchart showing a chain handover decision part of a group handover procedure performed by the first mobile relay according to an exemplary embodiment.

FIG. 3A is a flowchart showing a chain handover decision part of a chain handover procedure performed by the first mobile relay according to an exemplary embodiment. In step S301, the first mobile relay 121 receives a chain management control message from the source DeNB 164. The first mobile relay 121 sends a chain measurement report message according to a measurement command carried in chain measurement control message in step S303. After the network processes the operation of a chain handover decision function, the first mobile relay 121 will receive a RRC connection reconfiguration message in step S305. In step S307 the first mobile relay 121 performs the synchronization procedure.

Figure 3B:
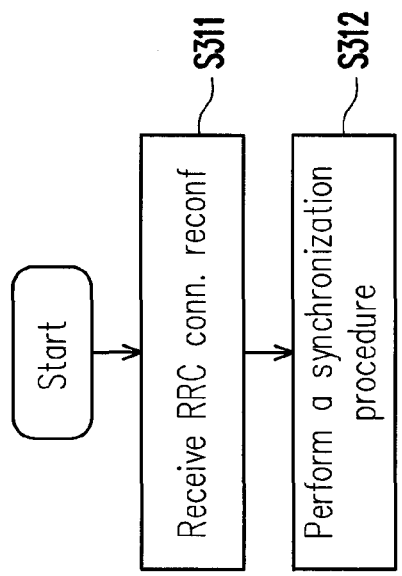
FIG. 3B is a flowchart showing a group handover decision part of a group handover procedure performed by the ith mobile relay ($i \neq 1$) according to an exemplary embodiment.

FIG. 3B is a flowchart showing a chain handover decision part of a chain handover procedure performed by the ith mobile relay (i≠1) according to an exemplary embodiment. If the ith mobile relay is accepted by the target DeNB 165 for performing the chain handover procedure, the ith mobile relay will receive a RRC connection reconfiguration message from the source DeNB 164 in step S311. In step S312 the ith mobile relay performs the synchronization procedure.

Figure 4A:
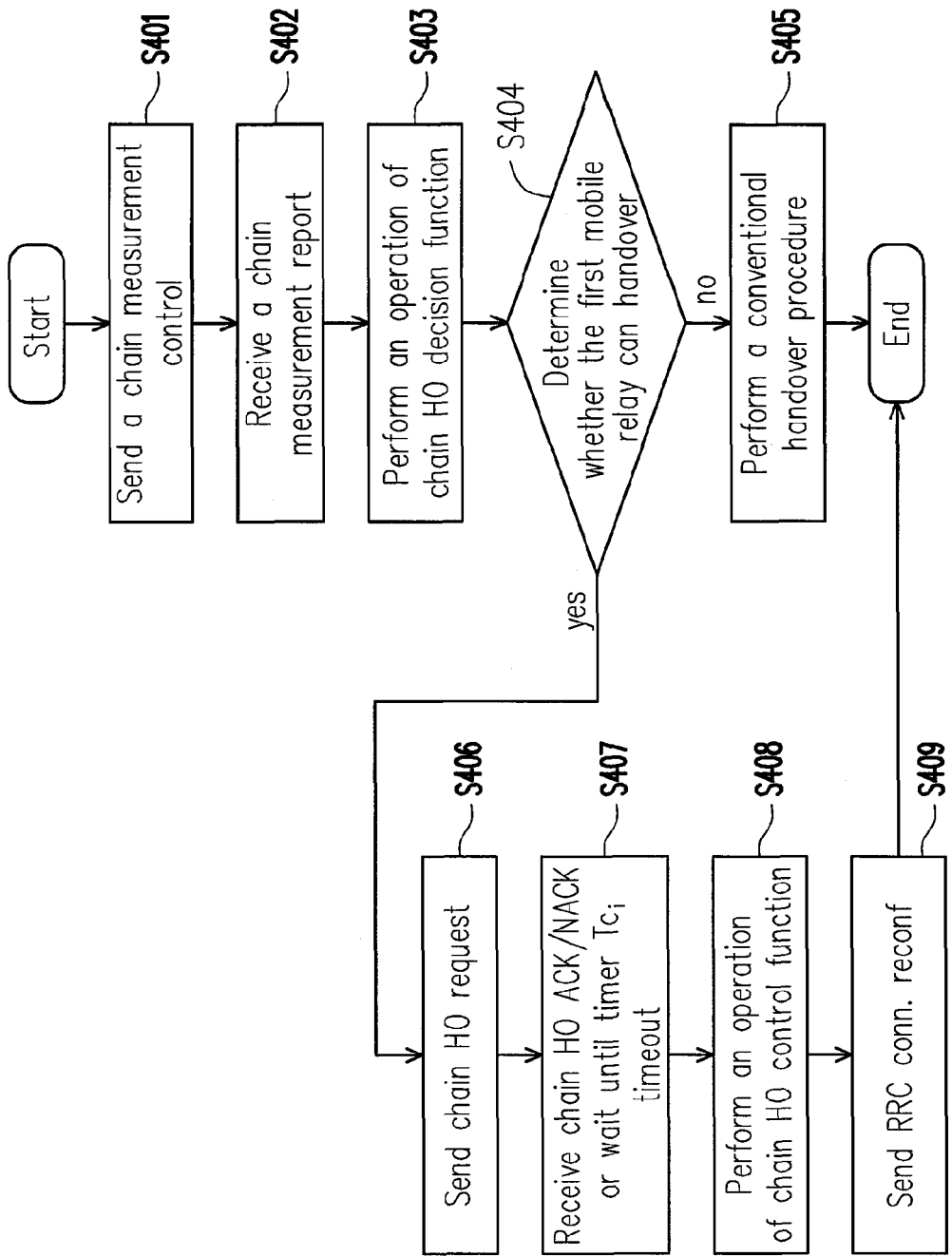
FIG. 4A is a flowchart showing a chain handover decision part of a group handover procedure for the first mobile relay performed by the source DeNB according to an exemplary embodiment.

FIG. 4A is a flowchart showing a chain handover decision part of a chain handover procedure for the first mobile relay performed by the source DeNB according to an exemplary embodiment. If the source DeNB 164 is capable to perform the chain handover procedure, the source DeNB 164 will send a chain measurement control message to all mobile relay in step S401. After a chain measurement report message is received in step S402, the source DeNB 164 will perform an operation of a chain handover decision function in step S403. In the chain handover decision function, the source DeNB 164 determines whether the mobile relay can handover or not in step S404. If no, the source DeNB 164 will restart a conventional handover procedure in step S405; otherwise, the source DeNB 164 sends a chain handover request to the target DeNB and starts a timer $Tc_1$ in the timer list of Tc in step S406. After receiving a chain handover ACK/NACK message in step S407, the source DeNB 164 performs an operation of chain handover control function in step S407. Based on the received chain handover ACK/NACK message, the source DeNB 164 sends a RRC connection reconfiguration message to the first mobile relay 121.

Figure 4B:
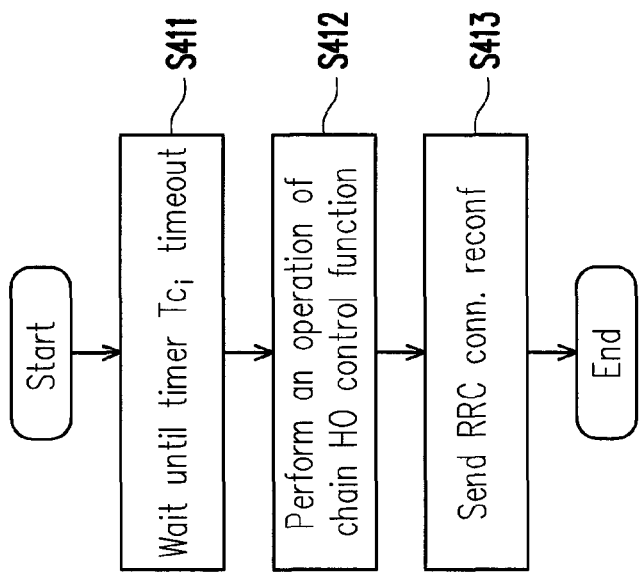
FIG. 4B is a flowchart showing a chain handover decision part of a group handover procedure for the ith mobile relay (i≠1) performed by the source DeNB according to an exemplary embodiment.

FIG. 4B is a flowchart showing a chain handover decision part of a chain handover procedure for the ith mobile relay (i≠1) performed by the source DeNB 164 according to an exemplary embodiment. After timer $Tc_{i-1}$ in the timer list of Tc timeouts in step S411, the source DeNB 164 performs an operation of chain handover control function in step S412. After the above steps, the source DeNB 164 sends a RRC connection reconfiguration to the ith mobile relay for the following chain handover.

Figure 5A:
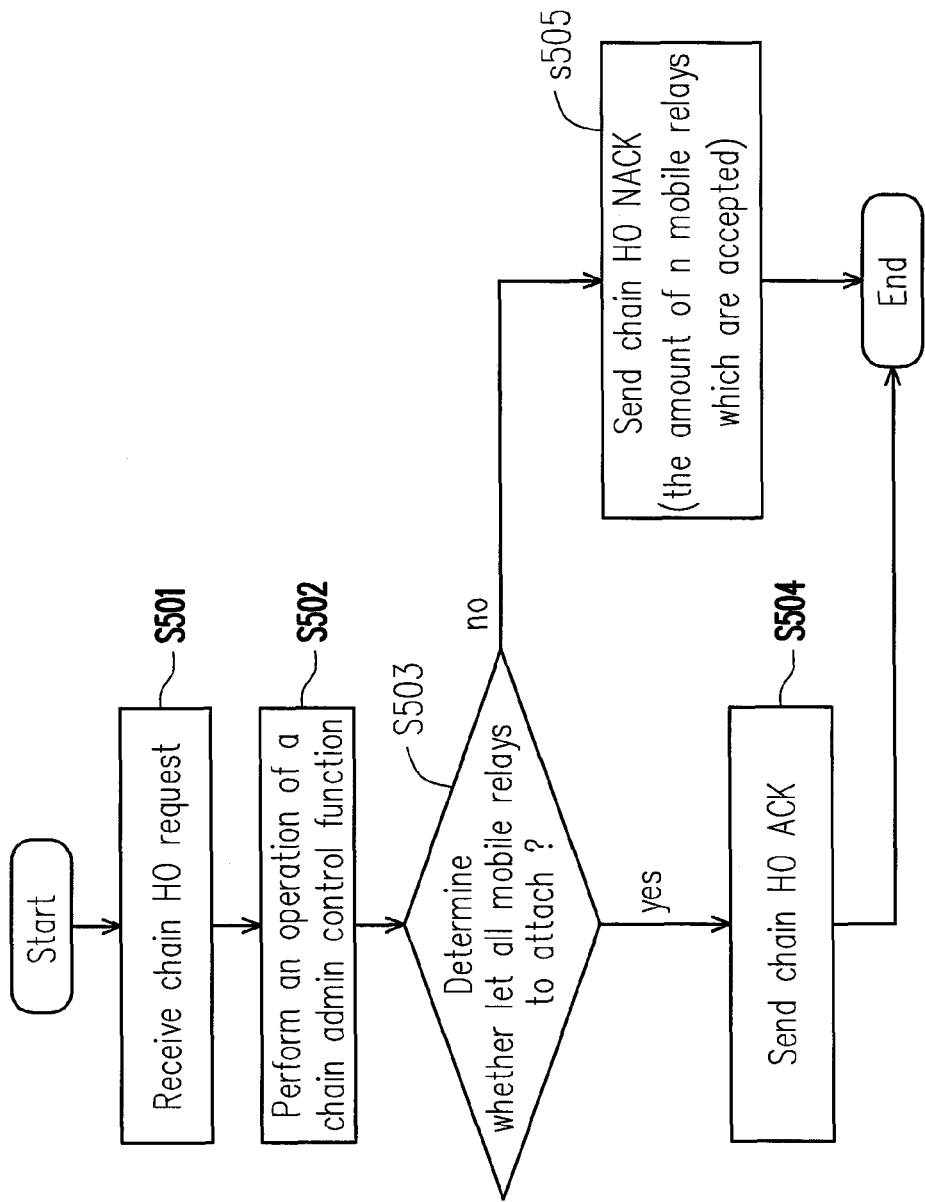
FIG. 5A is a flowchart showing a chain handover decision part of a group handover procedure for the first mobile relay performed by the target DeNB according to an exemplary embodiment.

FIG. 5A is a flowchart showing a chain handover decision part of a chain handover procedure for the first mobile relay performed by the target DeNB according to an exemplary embodiment. After receiving the chain handover request in step S501, the target DeNB 165 performs an operation of chain admission control function in step S502. The target DeNB 165 determines whether let all mobile relays to attach or not in step S503. If yes, the target DeNB 165 sends a chain handover request ACK message to the source DeNB 164 in step 504. Otherwise, the target DeNB 165 sends a chain handover request NACK message to the source DeNB 164 in step 505.

Figure 5B:
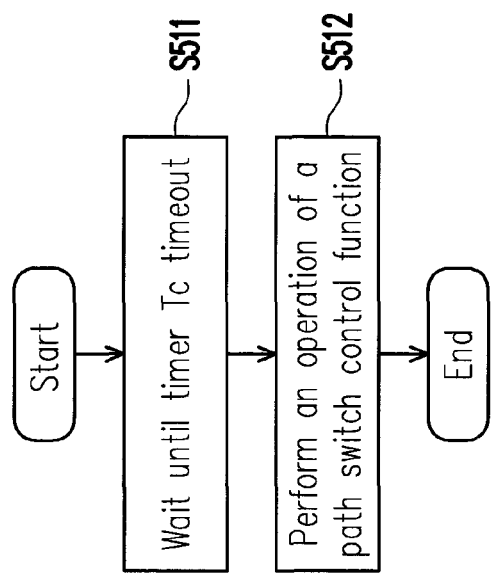
FIG. 5B is a flowchart showing a chain handover decision part of a group handover procedure for the ith mobile relay (i≠1) performed by the target DeNB according to an exemplary embodiment.

FIG. 5B is a flowchart showing a chain handover decision part of a chain handover procedure for the ith mobile relay (i≠1) performed by the target DeNB 165 according to an exemplary embodiment. After timer Tc timeouts in step S511, the source DeNB 164 performs an operation of chain handover control function in step S512. Then, the target DeNB 165 performs the path switch procedure.

According to the aforementioned descriptions, the source DeNB 164 computes a Tc list timer when needed. The functionality of individual Tc values is to predict the speed changes of the train. In generally, all values in Tc timer list may be fixed. The timers in the Tc list can be estimated in accordance with the velocity of the train, the length of each carriage, and the overlapping area of source and target DeNBs 164/165. After deciding the values of the timers, the source DeNB 164 sends the list of Tc to the target DeNB 165, where the list length is as the number of mobile relays that are allowed to handover in the train. For example, assuming n mobile relays, the source DeNB 164 decides $Tc_1$, $Tc_2$, . . . , $Tc_{n-1}$. The operation of chain handover control function and the operation of chain path switch control function automatically map the corresponding Tc values to corresponding mobile relays before starting the Tc timer. The list of Tc timers can be dynamically adjusted according to the speed of train. In one embodiment, the $Tc_1$ can be modified by a Δ Tc value.

However, the system can not actually know the train is speeding up or slowing down, the calculation of the Δ Tc value is based on the observation of the mobile relay's behaviours. In one embodiment, when the handover procedure is triggered by the measurement report or path switch procedure is triggered by synchronization procedure, and when the handover/path switch procedure is executed before Tc timeout, the source and target DeNBs 164/165 use the Δ Tc value to shorten the following Tc values.

In another embodiment, when the source and target DeNBs 164/165 realize that the handover interrupt time becomes longer or the synchronization procedure becomes longer, and when the handover and path switch procedures execute too earlier, the source and target DeNBs use the Δ Tc value to lengthen the following Tc values. It is noted that the network can let several mobile relays to perform handover or switch path procedure in parallel. This can be achieved by setting the corresponding Tc value to small values. In other words, the handover or path switch interval is small. The procedures for those mobile relays can be considered as parallel.

Figure 6A:
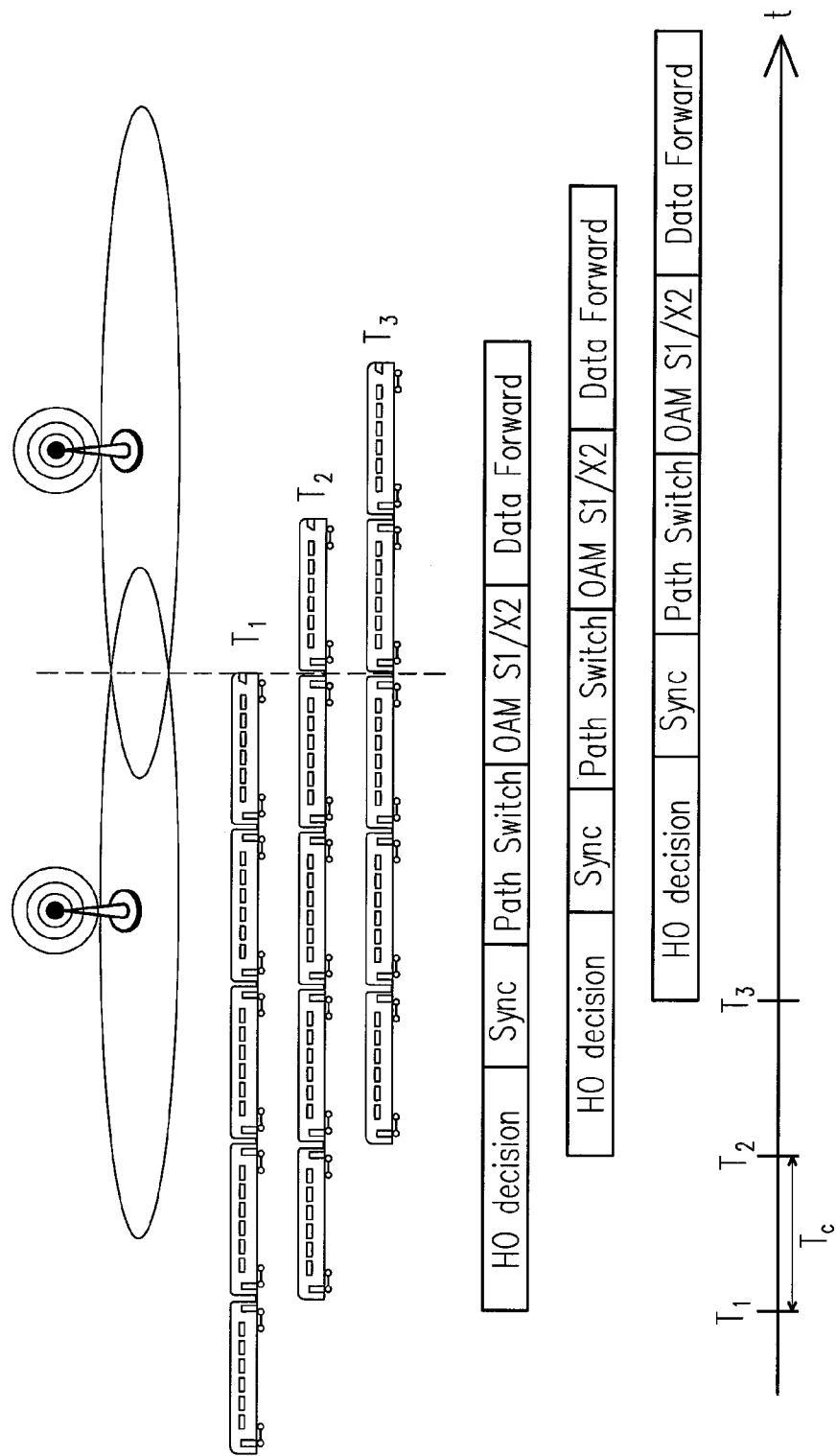
FIGS. 6A and 6B illustrate the concepts of handover procedures of the conventional method and the proposed chain or group handover scheme in the disclosure.
Figure 6B:
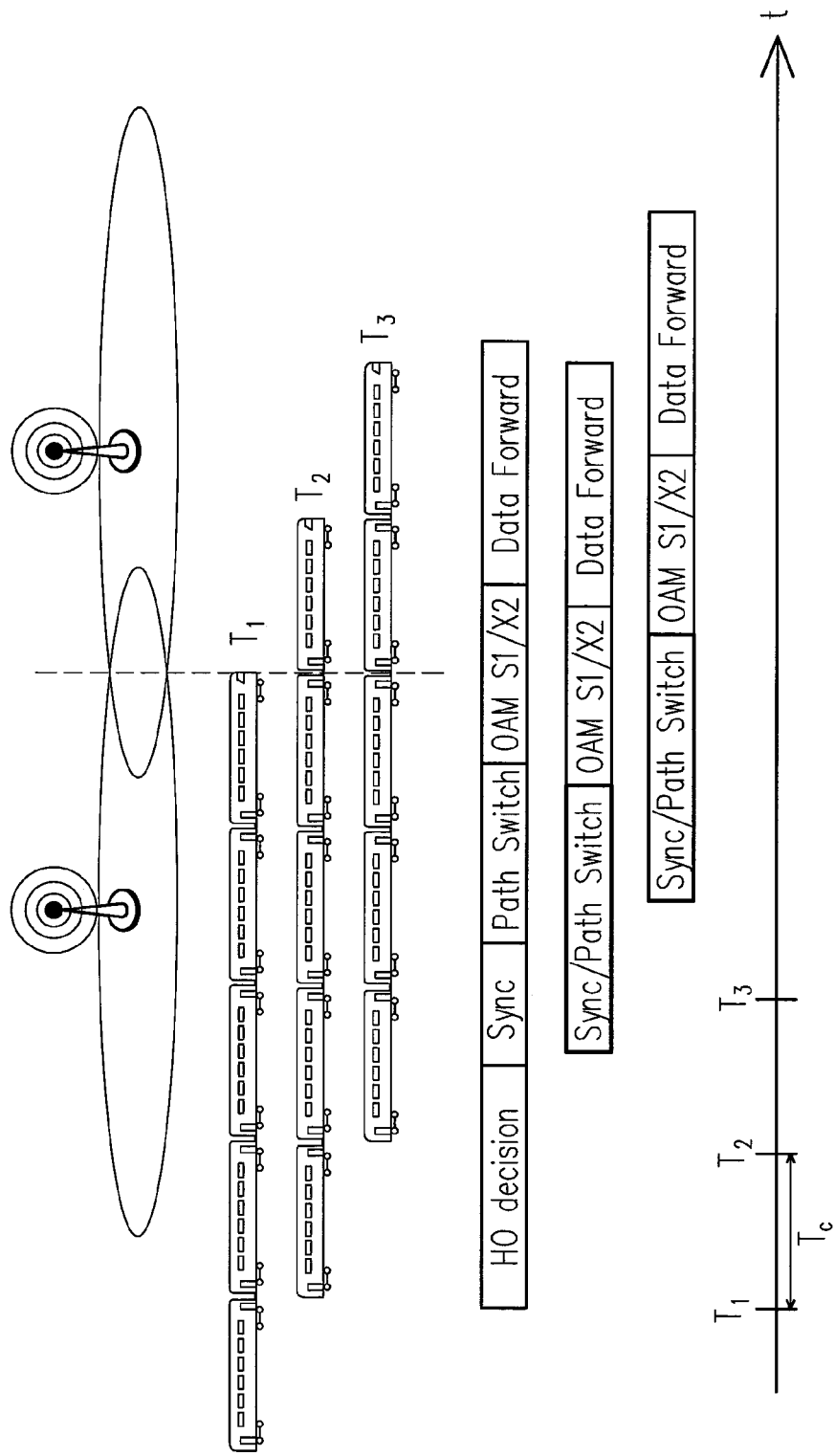

FIGS. 6A and 6B illustrate the concepts of handover procedures of the conventional method and the proposed chain handover scheme in the disclosure. Herein, $T_1$, $T_2$, and $T_3$ indicate three handover start time for mobile relays of the carriage 1, carriage 2, and carriage 3, respectively, as the train go along the train route in a high speed. The $T_c$ timer can be used to predict when the next carriage may need to handover or switch path. Referring to FIG. 6A, for a conventional method, when the first mobile relay performs handover, the next mobile relay also needs to perform handover in a short time. It could be noticed that similar procedures, 601, 602, and 603, are performed by mobile relays and the core network.

As for the proposed method shown in FIG. 6B, some procedures are redesigned to support to handover all mobile relays. If the head mobile relay (of the train) is in Chain-HO state, it does measurements. Then, the head mobile relay performs the procedures 621. The head mobile relay could represent for those mobile relays that are also in Chain-HO state. That is, when performing chain handover, the core network could issue handover commands to upcoming mobile relays directly without receiving any measurement reports from them. The network could also switch routing paths in advance for upcoming handover procedures. As the illustration of the procedures of non-head mobile relays 622 and 623, the message overhead could be reduced and the time could be conserve when the proposed chain handover is performed.

As the above description according an exemplary embodiment of the disclosure, the needed time of a chain handover procedure for all the mobile relays located on the train can be reduced. By performing the chain handover procedure, after the first mobile relay completes its handover, the other mobile relays which accepted by the network need not to go through the handover decision part of the conventional handover procedure, and the source/target DeNBs reduce the needed time for the synchronization and path switch part of the conventional handover procedure.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of enhancing handover over a wireless connection, for use in a plurality of moving devices, the method comprising:
   receiving a control message by one of a plurality of moving devices;
   transmitting a report message by the one of the plurality of moving devices, wherein the one of the plurality of moving devices sets in a state for group handover and represents all others of the plurality of moving devices for a handover decision; and
   determining a part or all of the plurality of moving devices are allowed to perform the group handover according to the report message, each of the part or all of the plurality of moving devices allowed to perform the group handover performs a handover procedure sequentially after receiving a reconfiguration message, wherein determining the part or all of the plurality of moving devices allowed to perform the group handover comprising:
   determining a group handover decision by a first control node according to the report message from the one of the plurality of moving devices,
   if the group handover is allowed, the first control node indicating a plurality of timers for controlling the group handover and sending a handover request to a second control node, wherein the handover request comprises a sequence of the plurality of moving devices.

2. The method as claimed in claim 1, wherein the control message comprises a measurement command, and the one of the plurality of moving devices prepares a measure report in the report message in response to the measurement command.

3. The method as claimed in claim 2, wherein the measure report comprises a sequence of user equipment identifiers (UE IDs) of the plurality of moving devices.

4. The method as claimed in claim 2, wherein the measure report further comprises information representing for a group of the plurality of moving devices.

5. The method as claimed in claim 2, wherein the measure report further comprises mobility information.

6. The method as claimed in claim 1, wherein the first control node indicates the plurality of timers for controlling the group handover by a timer list.

7. The method as claimed in claim 6, wherein the timer list comprises a handover timer for each of the plurality of moving devices in the group handover.

8. The method as claimed in claim 6, wherein the timer list comprises a path switch timer for each of the plurality of moving devices in the group handover.

9. The method as claimed in claim 1, wherein the sequence is represented as a sequence of user equipment identifiers (UE IDs) of the plurality of moving devices.

10. The method as claimed in claim 1, wherein wherein each of the plurality of moving devices is respectively placed in a corresponding carriage of a train, and wherein the measure report further comprises a sequence $S=\{u_1, u_2, \ldots, u_n\}$, where $u_k$ is an user equipment identifier (UE ID) of one of the plurality of moving devices in k-th carriage.

11. The method as claimed in claim 10, wherein each of the plurality of timers is corresponding to one of the plurality of moving devices for handover controlling.

12. The method as claimed in claim 1, wherein the plurality of timers is adjusted according to the velocity of the train, the length of the carriages of the train, or an overlapping area between the first control node and the second control node.

13. The method as claimed in claim 1, wherein the plurality of tuners for handover controlling is adjusted according to information from the report message by an overlapping area between the first control node and the second control node.

14. The method as claimed in claim 1, wherein each of the moving devices allowed to perform the group handover receives the reconfiguration message and performs the handover according to corresponding one of the plurality of timers, and after the corresponding timer is expired, the next handover procedure is configured according to a sequence of the plurality of moving devices.

15. The method as claimed in claim 1, further comprising the second control node transmitting a handover response to the first control node in response to the handover request, wherein the handover response comprises information indicating which of the plurality of moving devices are allowed to perform the group handover.

16. The method as claimed in claim 15, wherein the handover response comprises a first handover request response which indicates that all of the plurality of moving devices are allowed to perform the group handover, and information for the first control node to perform the group handover.

17. The method as claimed in claim 15, wherein when the first control node receives the handover response comprising the first handover request response, the first control node starts to perform all handover procedures for all of the plurality of moving devices according to the plurality of timers.

18. The method as claimed in claim 15, wherein the handover response comprises a confirmation of the plurality of timers for controlling the group handover.

19. The method as claimed in claim 18, wherein the plurality of timers for controlling the group handover is provided by a timer list.

20. The method as claimed in claim 19, wherein the timer list comprises a handover timer for each of the plurality of moving devices in the group handover.

21. The method as claimed in claim 19, wherein the timer list comprises a path switch timer for each of the plurality of moving devices in the group handover.

22. The method as claimed in claim 15, wherein the handover response comprises a second handover request response, which indicates that n moving devices are allowed to perform the group handover, wherein n is equal to zero or a number smaller than the total number of the the plurality of moving devices, the handover response further comprises information for the first control node to perform the group handover, if n is larger than zero.

23. The method as claimed in claim 22, wherein the handover response comprises a confirmation of the plurality of timers for controlling the group handover, if n is larger than zero.

24. The method as claimed in claim 23, wherein the plurality of timers for controlling the group handover is provided by a timer list.

25. The method as claimed in claim 24, wherein the timer list comprises a handover timer for each of the plurality of moving devices in the group handover.

26. The method as claimed in claim 24, wherein the timer list comprises a path switch timer for each of the plurality of moving devices in the group handover.

27. The method as claimed in claim 22, wherein when the first control node receives the handover response comprises the second handover request response, the first control node starts to perform handover procedures for the n moving devices, if n is larger than zero according to a plurality of timers in the timer list.

28. The method as claimed in claim 15, wherein when the first control node performs the handover procedures for the ith moving device in some or all of the plurality of moving devices allowed to perform the group handover, after the timer $Tc_{i-1}$ for the (i-1)th moving device in the timer list timeout, the first control node sends the reconfiguration message to the ith moving device to start performing the handover procedure.

29. The method as claimed in claim 28, wherein when the first control node sends the reconfiguration message to the ith moving device to start performing the handover procedure, substantially the same time the first control node sends another one of the timers to perform a path switch procedure for the ith moving device.

30. The method as claimed in claim 15, wherein the information further comprises Target C-RNTI, Target DRB ID (upload/download), Target eNB AS Security Algorithm from the second control node for the first control node to perform the group handover.

31. A moving device comprising a transmitter, a receiver, and a processing circuit coupled to the transmitter and the receiver, wherein the transmitter and the receiver respectively transmits and receives wireless signals, and the processing circuit is configured for receiving a control message;
setting in a state for group handover to representing others of the plurality of moving devices in the group handover; and
preparing and transmitting a measure report to determine a number of the plurality of moving devices which are allowed to sequentially perform handover operation in the group handover, wherein the measure report comprises a sequence of user equipment identifiers (UE IDs) of the plurality of moving devices,
wherein a control node receiving the measure report indicates a plurality of timers for controlling the group handover and sends a handover request to a second control node,
wherein the timers comprises a handover timer for each of the plurality of moving devices in the group handover.

32. The moving device as claimed in claim 31, wherein the control message comprises a measurement command, and the one of the plurality of moving devices prepares the measure report in the report message in response to the measurement command.

33. The moving device as claimed in claim 31, wherein the measure report further comprises information representing for a group of the plurality of moving devices.

34. A control node comprising a transmitter, a receiver, and a processing circuit coupled to the transmitter and the receiver, wherein the transmitter and the receiver respectively transmits and receives wireless signals, and the processing circuit is configured to:
transmitting a control message;
receiving a report message in response to the control message by a moving device of a plurality of moving devices, wherein the one of the plurality of moving devices sets in a state for group handover to representing others of the plurality of moving devices in the group handover;
determining a group handover decision according to the report message from the one of the plurality of moving devices,
if the result of the group handover decision indicates that the group handover is allowed, the control node indicating a plurality of timers for controlling the group handover and sending a handover request to a target control node; and
receiving a handover response in response to the handover request, wherein the handover response comprises information related to that some or all of the plurality of moving devices are allowed to perform the group handover,
wherein the plurality of timers for sequentially controlling the group handover is provided by a timer list, and the timer list comprises a handover timer for each of the plurality of moving devices in the group handover.

35. The control node as claimed in claim 34, wherein the timer list comprises a path switch timer for each of the plurality of moving devices in the group handover.

36. The control node as claimed in claim 34, wherein the handover response comprises a first handover request response, which indicates that all of the plurality of moving devices are allowed to perform the group handover, and information to perform the group handover.

37. The control node as claimed in claim 34, wherein when the handover response comprising the first handover request response is received, the processing circuit is further configured to starting to sequentially perform all handover procedures for all of the plurality of moving devices according to the plurality of timers.

38. The control node as claimed in claim 34, wherein the handover response comprises a confirmation of the plurality of timers for controlling the group handover.

39. The control node as claimed in claim 34, wherein the handover response comprises a second handover request response, which indicates that n moving devices are allowed to perform the group handover, wherein n is equal to zero or a number smaller than the total number of the the plurality of moving devices, the handover response further comprises information to perform the group handover, if n is larger than zero.

40. The control node as claimed in claim 39, wherein when the handover response comprises the second handover request response, the processing circuit is further configured to starting to perform handover procedures for the n moving devices, if n is larger than zero according to the plurality of timers.

41. The control node as claimed in claim 34, wherein when the processing circuit is further configured to performing a handover procedure for the ith moving device in some or all of the plurality of moving devices allowed to perform the group handover, after the timer $Tc_{i-1}$ for the (i−1)th moving device in the timer list timeout, the processing circuit is further configured to sending a reconfiguration message to the ith moving device to start performing the handover procedure, wherein i is an integer and is greater than zero and smaller than or equal to the number of the plurality of moving devices allowed to perform the group handover.

42. The control node as claimed in claim 41, wherein when the processing circuit is further configured to sending the reconfiguration message to the ith moving device to start performing the handover procedure, substantially the same time the processing circuit is further configured to sending another one of the plurality of timers to perform a path switch procedure for the ith moving device.

43. The control node as claimed in claim 34, wherein the processing circuit is further configured to sequentially and respectively sending a reconfiguration message and performing a handover procedure according to corresponding one of the timers, and each of the moving devices allowed to perform the group handover receives, and after the corresponding timer is expired, the next handover procedure is configured according to a sequence of the plurality of moving devices.

* * * * *